United States Patent
Kwon et al.

(10) Patent No.: US 6,962,290 B2
(45) Date of Patent: *Nov. 8, 2005

(54) BREAD MAKER AND CONTROL METHOD THEREOF

(75) Inventors: Yong-hyun Kwon, Suwon (KR); Dong-bin Lim, Suwon (KR); Jang-woo Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/391,772

(22) Filed: Mar. 20, 2003

(65) Prior Publication Data

US 2004/0011207 A1 Jan. 22, 2004

(30) Foreign Application Priority Data

Jul. 19, 2002 (KR) ........................................ 2002-42594

(51) Int. Cl.$^7$ ................................................. G06K 7/10
(52) U.S. Cl. ............................ 235/462.01; 235/462.41; 99/326; 99/328; 366/240
(58) Field of Search ................... 235/462.01, 462.41; 99/326, 328, 341, 342; 366/240

(56) References Cited

U.S. PATENT DOCUMENTS

| | | | |
|---|---|---|---|
| 3,839,628 A | | 10/1974 | Higgins et al. |
| 3,841,147 A | | 10/1974 | Coll et al. |
| 4,311,397 A | | 1/1982 | Wright |
| 4,747,690 A | | 5/1988 | Hayashi |
| 4,803,086 A | * | 2/1989 | Hedenberg .................... 426/87 |
| 4,836,683 A | | 6/1989 | Aoyama |
| 4,953,984 A | | 9/1990 | Miyoshi |
| 4,984,512 A | | 1/1991 | Takahashi et al. |
| 5,019,972 A | | 5/1991 | Rim |
| 5,145,252 A | | 9/1992 | Oh |
| 5,146,840 A | * | 9/1992 | Hedenberg .................... 99/328 |
| 5,510,127 A | * | 4/1996 | Wong et al. .................. 426/19 |
| 5,556,198 A | | 9/1996 | Dickson, Jr. et al. |
| 5,921,367 A | | 7/1999 | Kashioka et al. ............ 192/130 |
| 5,934,177 A | | 8/1999 | Takeda et al. |
| 5,947,009 A | * | 9/1999 | Hedenberg .................... 99/348 |
| 6,058,831 A | * | 5/2000 | Nakano et al. ............... 99/348 |
| 6,124,583 A | * | 9/2000 | Bowers ....................... 219/714 |
| 6,401,599 B1 | * | 6/2002 | Maeda et al. ................. 99/327 |
| 2004/0011209 A1 | | 1/2004 | Kwon |
| 2004/0011212 A1 | | 1/2004 | Lee |
| 2004/0011213 A1 | | 1/2004 | Kwon |
| 2004/0013029 A1 | | 1/2004 | Kwon |

FOREIGN PATENT DOCUMENTS

| | | |
|---|---|---|
| JP | 64-500320 | 2/1989 |
| JP | 2001-523444 | 11/2001 |
| KR | 1991-10203 | 4/1988 |
| KR | 92-1838 | 2/1992 |
| KR | 20-220095 | 1/2001 |
| KR | 10-336514 | 5/2002 |
| KR | 2002-57012 | 7/2002 |

OTHER PUBLICATIONS

Korean OfficeAction dated Oct. 26, 2004 for corresponding Korean Application No. 2002–42594.

* cited by examiner

*Primary Examiner*—Steven S. Paik
(74) *Attorney, Agent, or Firm*—Staas & Halsey LLP

(57) ABSTRACT

A bread maker including a pair of kneading drums inside an oven compartment, to which are attached opposite ends of a mixing bag containing bread ingredients, the kneading drums reversing rotary direction periodically; a bar code scanner to read a bar code on the mixing bag; a drum driving part rotating the kneading drums in clockwise and counter-clockwise directions; a bar code reading checking part sensing whether the bar code scanner is reading the bar code; and a controller determining whether the bar code scanner is reading the bar code based upon a sensed signal output from the bar code reading checking part, and controlling the drum driving part to rotate the kneading drums at a bar code reading speed while the bar code scanner reads the bar code, and at a faster dough kneading speed when the bar code scanner has completely read the bar code.

15 Claims, 9 Drawing Sheets

BREAD MAKER AND CONTROL METHOD THEREOF

CROSS-REFERENCE TO RELATED APPLICATIONS

This application claims the benefit of Korean Application No. 2002-42594, filed Jul. 19, 2002, in the Korean Intellectual Property Office, the disclosure of which is incorporated herein by reference.

BACKGROUND OF THE INVENTION

1. Field of the Invention

The present invention relates to a bread maker and a method of controlling the bread maker.

2. Description of the Related Art

Generally, making bread is so complicated that it is difficult for an average person to manually make satisfactory bread at home. That is, making the bread includes multiple steps of mixing ingredients such as flour, sugar, yeast, etc., to form a dough; kneading the dough, leavening the dough; baking the dough; and so on.

Therefore, various bread makers have been developed to allow a user to easily make bread. The bread maker automatically performs the foregoing multiple steps and provides finished bread to the user.

For example, a bread maker disclosed in Korean Patent Publication No.1991-10203 includes a pair of parallel kneading drums at upper and lower parts of an oven compartment that reverse rotary direction periodically, a baking tray between the pair of kneading drums, a heater heating the inside of the oven compartment, a bar code scanner, etc.

In the bread maker, disclosed in Korean Patent Publication No. 1991-10203, upper and lower ends of a mixing bag filled with flour, water, etc., are attached to the upper and lower kneading drums, and then the mixing bag is reciprocated up and down for a predetermined period of time, thereby kneading the dough in the mixing bag.

After completing the kneading of the dough, the mixing bag is automatically separated from the upper kneading drum, and wound on the lower kneading drum, with the dough being squeezed out of the mixing bag and into the baking tray. Thereafter, a heater heats the inside of the oven compartment, thereby leavening and baking the dough for a predetermined period of time.

The bread is made according to a bar code that is printed on the mixing bag that includes information on kneading time, leavening time, baking time, etc., for a particular recipe. That is, the bar code is read by the bar code scanner and the read data are transmitted to a controller, so that the controller controls the kneading drums, the heater, etc., on the basis of the read data.

However, in the conventional bread maker, when the bar code scanner reads the bar code by rotating the upper kneading drum, the upper kneading drum may become jammed by the bar code of the mixing bag. Further, when the mixing bag is wound on the kneading drums, the kneading drums may become jammed by an extraneous substance, so that it may become dangerous to operate the bread maker, and internal components may be damaged.

SUMMARY OF THE INVENTION

It is an aspect of the present invention to provide a bread maker and a control method thereof that can protect the bread maker from damage caused by, for example, kneading drums becoming jammed by a mixing bag or an extraneous substance while a bar code is read.

Additional aspects and advantages of the invention will be set forth in part in the description that follows, and, in part, will be obvious from the description, or may be learned by practice of the invention.

To achieve the above and/or other aspects according to the present invention, there is provided a bread maker including a main body forming an oven compartment; a pair of parallel kneading drums spaced apart from each other inside the oven compartment, to which are attached opposite ends of a mixing bag containing ingredients for bread, the kneading drums reversing rotary direction periodically; a bar code scanner near one of the kneading drums to read a bar code printed on, or applied to, the mixing bag; a drum driving part rotating the kneading drums in clockwise and counterclockwise directions; a bar code reading checking part sensing whether the bar code scanner is reading the bar code; and a controller determining whether the bar code scanner is reading the bar code based upon a sensed signal output from the bar code reading checking part, and controlling the drum driving part to rotate the kneading drums at a predetermined bar code reading speed while the bar code scanner reads the bar code, and to rotate the kneading drums at a dough kneading speed that is faster than the bar code reading speed when the bar code scanner has completely read the bar code.

The bread maker further includes a rotation sensing part sensing a rotation speed of the one of the kneading drums, wherein the controller determines the rotation speed of the one of the kneading drums a sensed signal of the rotation sensing part while the bar code is being read, and stops the drum driving part from operating when the rotation speed of the one of the kneading drums is less than the predetermined bar code reading speed.

The rotation sensing part includes a disk part rotating with the one of the kneading drums, and having at least one projection radially extending from a circumference thereof; and a disk sensor emitting a light toward the disk part and outputting a pulse signal according to interruption of the light by rotation of the at least one projection of the disk part.

The disk part includes a first disk having a single projection; and a second disk having a plurality of projections along a circumference thereof at regular intervals.

The disk sensor comprises a light emitting part and a light receiving part facing each other with the disk part therebetween, the disk sensor outputting the pulse signal when the at least one projection of the disk part interrupts light emitted from the light emitting part to the light receiving part.

To achieve the above and/or other aspects according to the present invention, there is provided a method of controlling a bread maker having a main body forming an oven compartment, a pair of parallel kneading drums spaced apart from each other inside the oven compartment, to which are attached opposite ends of a mixing bag containing ingredients for bread, the kneading drums reversing rotary direction periodically, a bar code scanner near one of the kneading the mixing bag, and a drum driving part rotating the kneading drums in clockwise and counterclockwise directions, the method including rotating the kneading drums holding the mixing bag; determining whether the bar code scanner reads the bar code; and rotating the one of the kneading drums at a predetermined bar code reading speed while the bar code scanner reads the bar code.

The method further includes stopping the drum driving part from operating when a rotation speed of the one of the kneading drums is less than the predetermined bar code reading speed by determining the rotation speed of the one of the kneading drums while the bar code is read.

The bread maker includes a disk part rotating with the one of the kneading drums, and having at least one projection radially extending from a circumference thereof; and a disk sensor sensing the at least one projection of the disk part and outputting a pulse signal, wherein the rotation speed of the one of the kneading drums is determined based upon the pulse signal output from the disk sensor.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
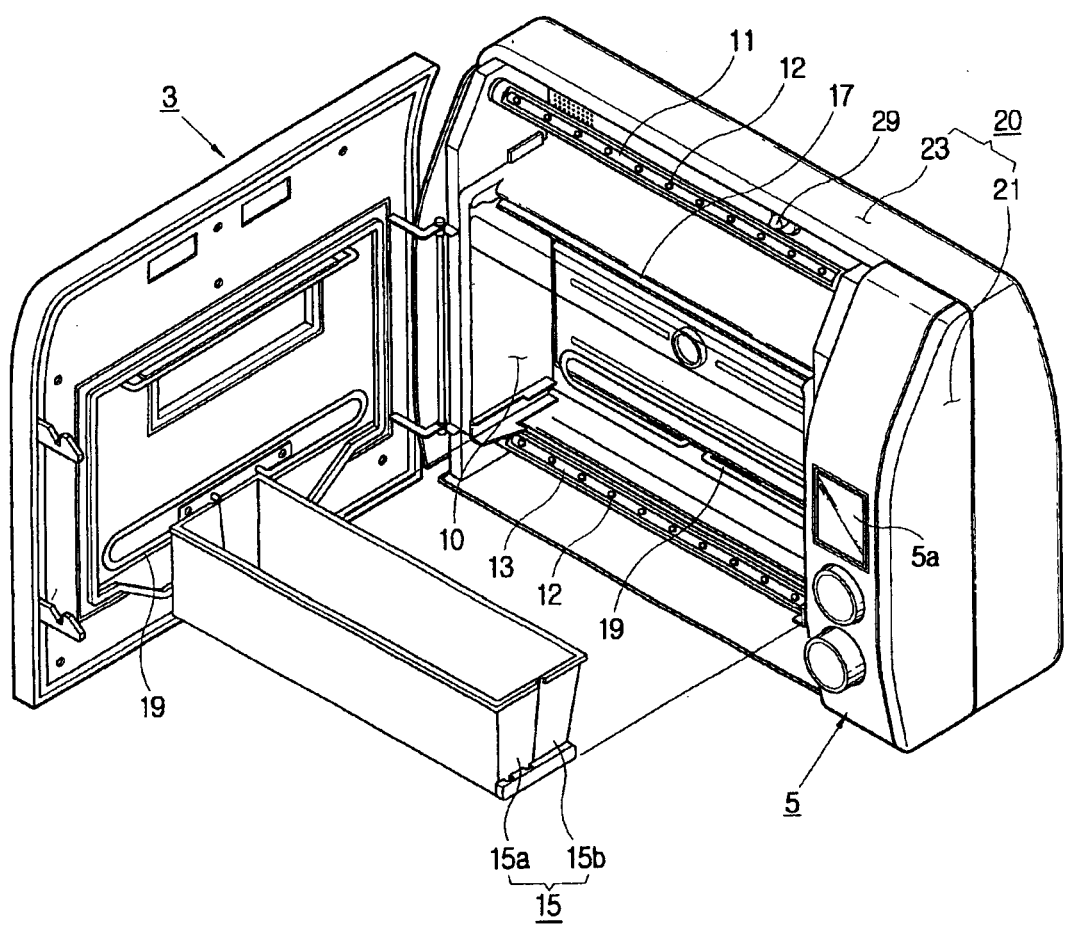
FIG. 1 is a perspective view of a bread maker according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 2:
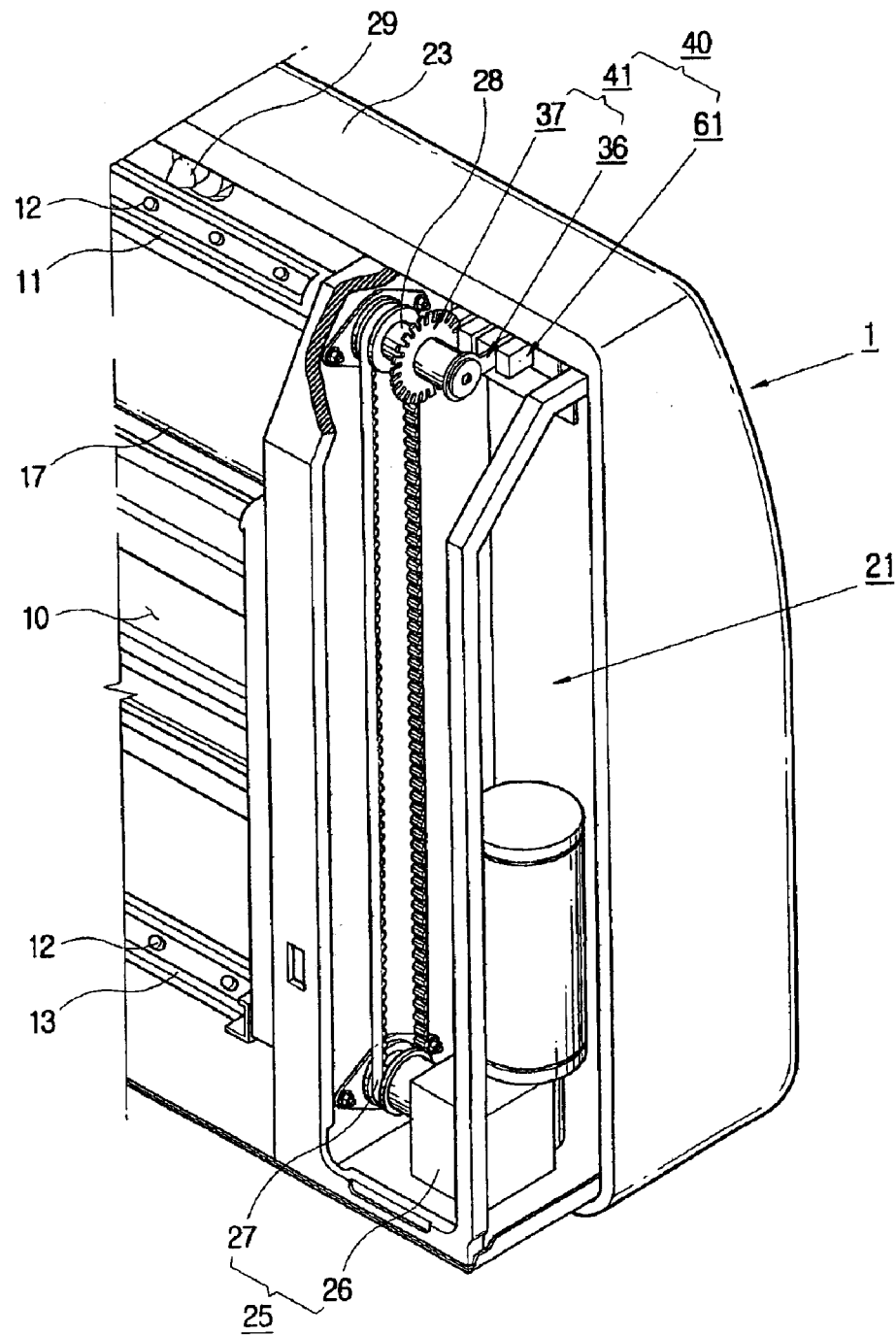
FIG. 2 is a perspective view of an electric component compartment of the bread maker shown in FIG. 1.
Figure 3:
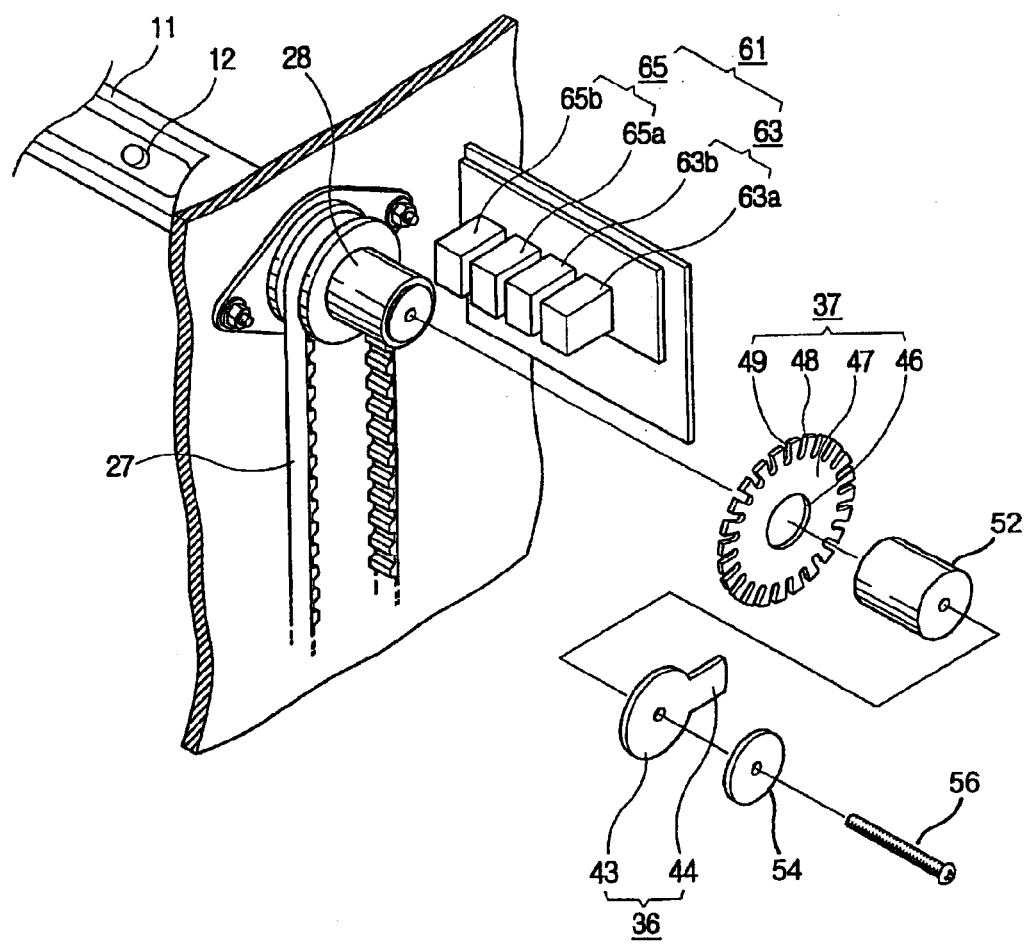
FIG. 3 is an exploded perspective view of a rotation sensing part of the bread maker shown in FIG. 2.

As shown in FIGS. 1 through 3, a bread maker according to an embodiment of the present invention includes a main body 1 divided into an oven compartment 10 and an electric component compartment 20, a door 3 in the front of the main body 1 to open and close a front opening of the oven compartment 10, a control panel 5 in the front of the main body 1 having a display panel 5a displaying an operating state of the bread maker, and a power supply (not shown) supplying electric power to the electric components.

Figure 4:
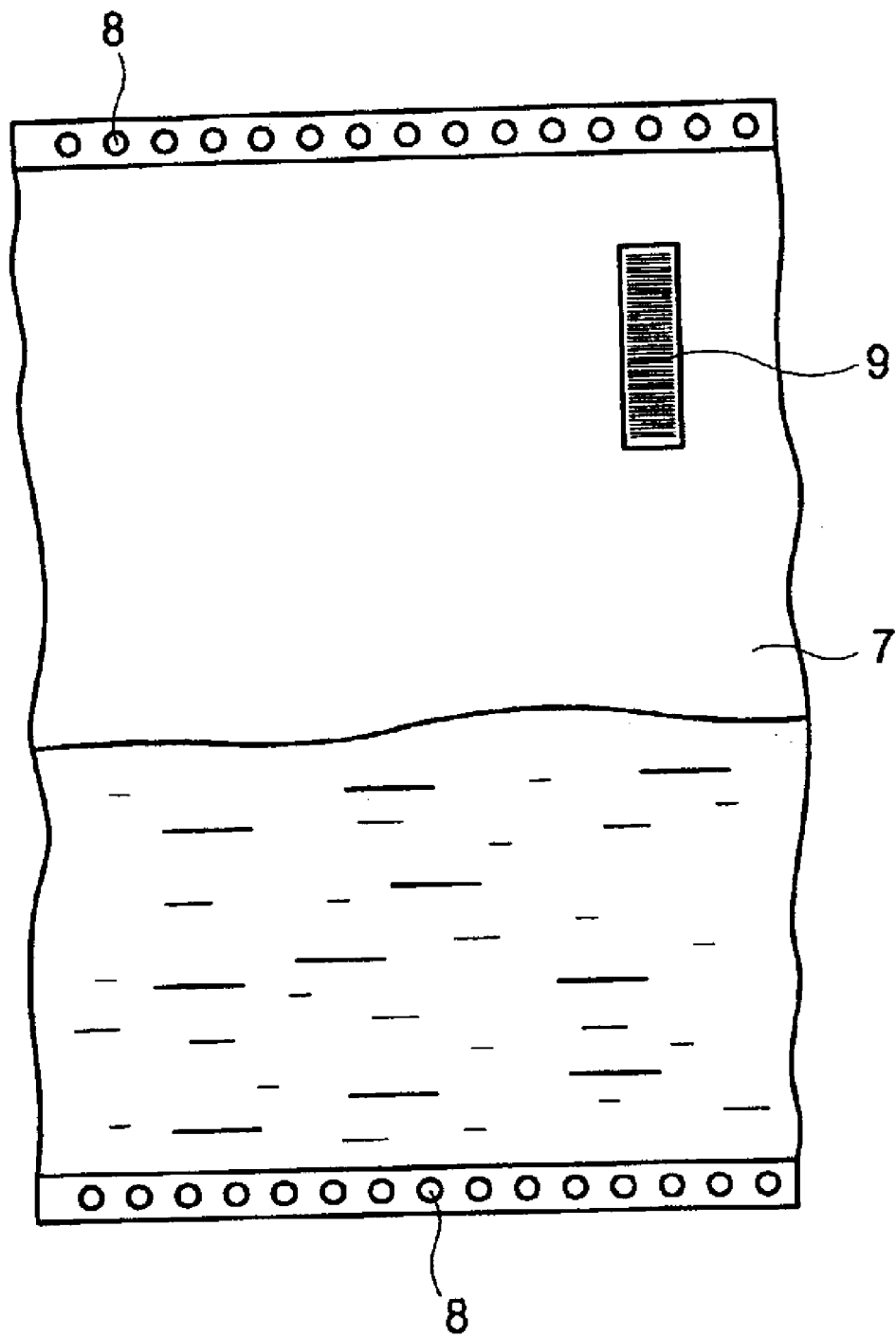
FIG. 4 is a front view of a mixing bag used in the bread maker according to the embodiment of the present invention.

Inside the oven compartment 10, upper and lower kneading drums 11 and 13 are provided in parallel and rotate in clockwise and counterclockwise directions. Opposite ends 8 of a mixing bag 7 (refer to FIG. 4) filled with ingredients for bread are attached to projections 12 on the upper and lower kneading drums 11 and 13, and the mixing bag 7 is wound on the upper and lower kneading drums 11 and 13.

In a lower part of the oven compartment 10, there is a baking tray 15 in which the kneaded dough is baked between the upper and lower kneading drums 11 and 13. The baking tray 15 includes first and second trays 15a and 15b, each having an "L"-shaped section symmetrical to one another that combine into a box shape having an open top. In an upper part of the oven compartment 10, a pair of squeezing members 17 is between the upper kneading drum 11 and the baking tray 15 to prevent the dough kneaded in the mixing bag 7 from moving outside the baking tray 15.

At upper and lower parts of inside walls of the oven compartment 10 and the door 3 are heaters 19 for heating the inside of the oven compartment 10.

The electric component compartment 20 includes a first component compartment 21 placed beside the oven compartment 10 and a second component compartment 23 placed behind the oven compartment 10. Inside the first component compartment 21 is a drum driving part 25 that rotates the upper and lower kneading drums 11 and 13 in clockwise and counterclockwise directions. Inside the second component compartment 23 is a bar code scanner 29 that reads a bar code 9 printed on, or applied to, the mixing bag 7 that is wound on the upper and lower kneading drums 11 and 13. The bar code scanner 29 may move close to, and away from, an outer circumference of the upper kneading drum 11.

The drum driving part 25 includes a motor 26 that rotates the lower kneading drum 13, and a belt 27 that transmits a rotary movement of the lower kneading drum 13 to a rotation shaft 28 of the upper kneading drum 11.

A rotation sensing part 40 senses rotation of at least one of the upper and lower kneading drums 11 and 13 and outputs pulse signals corresponding to the sensed rotation. A controller 70 (described below) controls the upper and lower kneading drums 11 and 13 according to the pulse signals output from the rotation sensing part 40.

The rotation sensing part 40 includes a disk part 41 attached to the rotation shaft 28 of the upper kneading drum 11, and a rotation sensor 61 placed near the disk part 41 that outputs a pulse signal by sensing the rotation of the disk part 41.

The disk part 41 includes a first disk 36 that allows the rotation sensor 61 to sense one revolution of the upper kneading drum 11, and a second disk 37 that allows the rotation sensor 61 to sense a rotation of the upper kneading drum that is less than one complete turn.

The first disk 36 is a circular plate 43, which is separated from the second disk 37 by a cylindrical part 52 and connected to the rotation shaft 28 of the upper kneading drum 11 using a washer 54 and a bolt 56. The circular plate 43 is formed with a single projection 44 radially extended therefrom. Hence, the first disk 36 rotates with the upper kneading drum 11 and allows the rotation sensor 61 to sense one revolution of the upper kneading drum 11.

The second disk 37 is a circular plate 47 with a shaft combining hole 46 used to attach the circular plate 47 to the rotation shaft 28 of the upper kneading drum 11. The circular plate 47 has a plurality of slots 49 along the circumference thereof at regular intervals, forming a plurality of projections 48. For example, in the embodiment shown in FIG. 3, the second disk 37 has twenty-four slots 49, forming twenty-four projections 48. Hence, the second disk 37 rotates with the upper kneading drum 11 and allows the rotation sensor 61 to sense a rotation of the upper kneading drum 11 that is less than one revolution.

The rotation sensor 61 includes a first disk sensor 63 sensing the single projection 44 of the first disk 36 and outputting one pulse signal per revolution of the upper kneading drum 11, and a second disk sensor 65 sensing the twenty-four projections 48 of the second disk 37 and outputting twenty-four pulse signals per revolution of the upper kneading drum 11. That is, while the upper kneading drum 11 makes one revolution, the first and second disk sensors 63 and 65 output one and twenty-four pulse signals, respectively.

The first and second disk sensors 63 and 65 are each used as a pulse generator, and include light emitting parts 63a and 65a that emit a sensing signal such as infrared rays toward the first and second disks 36 and 37, and light receiving parts 63b and 65b that face the light emitting parts 63a and 65a, respectively, across the first and second disks 36 and 37 and receive the light emitted from the light emitting parts 63a and 65a, respectively.

The first disk sensor 63 senses when the single projection 44 of the first disk 36 interrupts the light emitted from the light emitting part 63a to the light receiving part 63b, thereby outputting one pulse signal per one complete turn of the upper kneading drum 11.

The second disk sensor 65 senses when the twenty-four projections 48 of the second disk 37 interrupt the light emitted from the light emitting part 65a to the light receiving part 65b, thereby outputting twenty-four pulse signals per revolution of the upper kneading drum 11.

The rotation sensor 61 transmits the pulse signals output from the first and second disk sensors 63 and 65 to the controller 70, and the controller 70 determines a rotation speed of the upper kneading drum 11 based upon the output pulse signals. Thus, the controller 70 controls the motor 26 of the drum driving part 25 to rotate the upper and lower kneading drums 11 and 13 according to the determined rotation speed thereof, thereby causing the mixing bag 7 to be properly reciprocated up and down.

Figure 5:
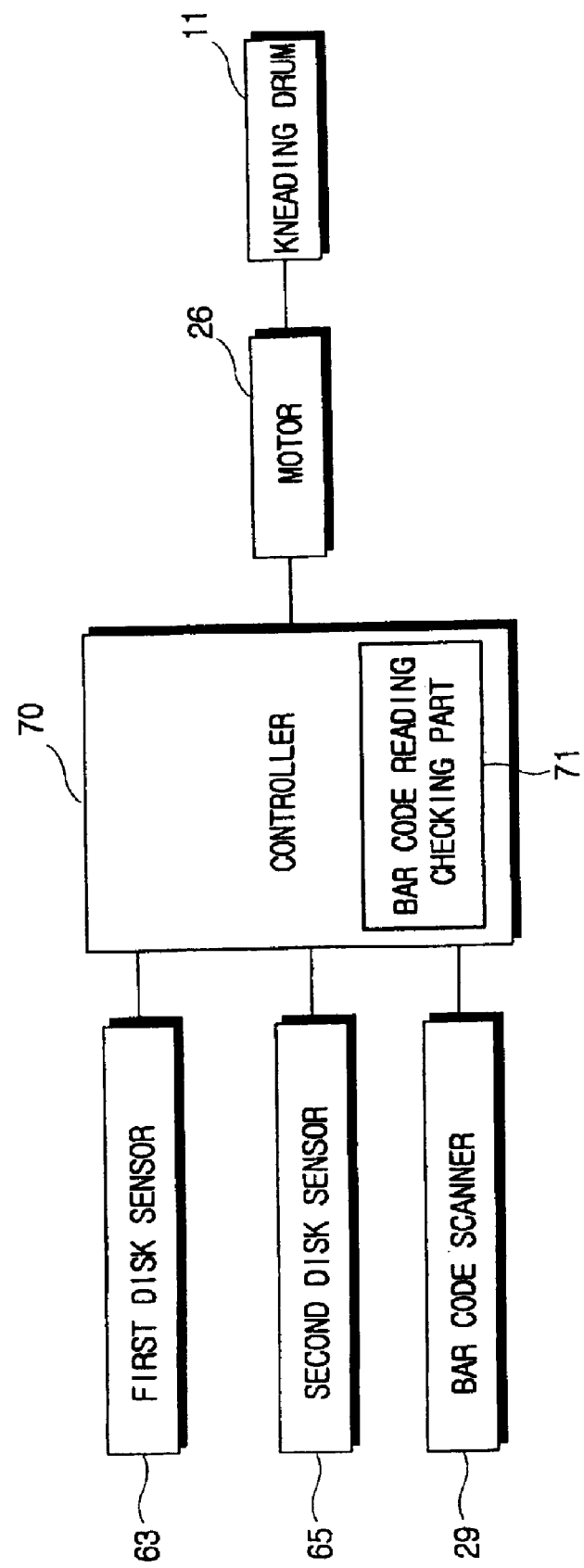
FIG. 5 is a control block diagram of the bread maker according to the embodiment of the present invention.

Thus, as shown in FIG. 5, the bread maker according to the embodiment of the present invention includes the first and second disk sensors 63 and 65 sensing the rotation of the first and second disks 36 and 37, and the controller 70 receiving the pulse signals from the first and second disk sensors 63 and 65, determining the rotate rate of the upper and lower kneading drums 11 and 13 on the basis of the received pulse signals, and controlling the rotation speed of the upper and lower kneading drums 11 and 13 according to the bar code 9 read by the bar code scanner 29. The controller 70 includes a bar code reading checking part 71 that senses whether the bar code scanner 29 reads the bar code 9.

According to the present invention, when the bar code scanner 29 starts reading the bar code 9, the controller 70 controls the power supply to decrease electric current supplied to the motor 26 driving the kneading drums, thereby slowly rotating the upper and lower kneading drums 11 and 13 at a normal predetermined bar code reading speed to allow the bar code scanner 29 to read the bar code 9. Thereafter, when the bar code scanner 29 completely reads the bar code 9, the controller 70 controls the power supply to increase the electric current supplied to the motor 26, thereby rotating the upper and lower kneading drums 11 and 13 to knead the dough in the mixing bag at a kneading speed. Further, while the bar code scanner 29 reads the bar code 9, the controller 70 receives the pulse signals output from the first and second disk sensors 63 and 65, and compares the received pulse signals with the pulse signal output at the normal speed for reading the bar code 9 to determine whether the bar code scanner 29 is normally reading the bar code 9, or whether there is a problem in reading the bar code 9.

Figures 6A, 6B:
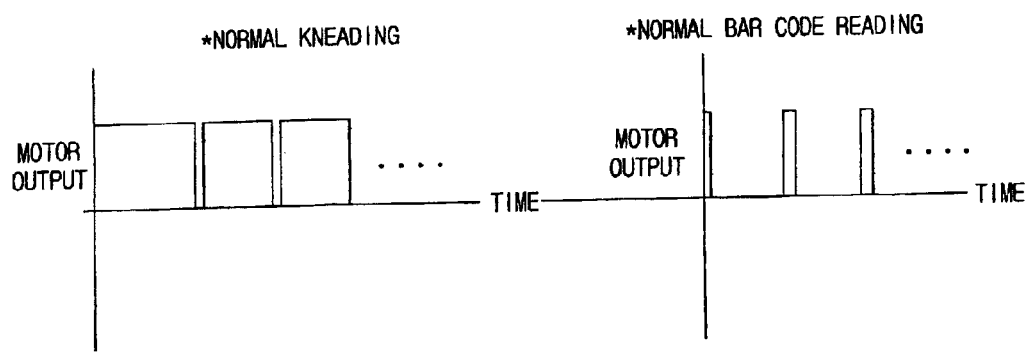
FIGS. 6A and 6B illustrate output signals of a motor of the bread maker according to the embodiment of the present invention.

That is, as shown in FIGS. 6A and 6B, because the upper and lower kneading drums 11 and 13 are rotated more slowly when reading the bar code 9 than when kneading the dough to allow the bar code scanner 29 to read the bar code 9, the electric current supplied to the motor 26 becomes smaller when reading the bar code 9 than when kneading the dough. Further, a pulse width of the pulse signal output from the first and second disk sensors 63 and 65 as the kneading drum 11 rotates becomes smaller when reading the bar code 9 than when kneading the dough.

Figures 7A, 7B:
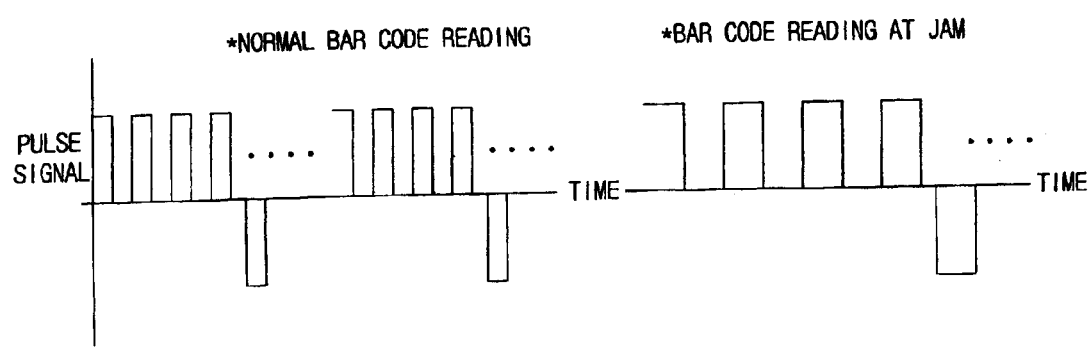
FIGS. 7A and 7B illustrate pulse signals of the rotation sensing part of FIG. 3.

Furthermore, as shown in FIGS. 7A and 7B, the pulse width of the pulse signal output from the first and second disk sensors 63 and 65 becomes larger when the upper and lower kneading drums 11 and 13 become jammed, for example, by the mixing bag 7 or an extraneous substance, than when the upper and lower kneading drums 11 and 13 normally rotate to allow the bar code scanner 29 to read the bar code 9.

Figure 8:
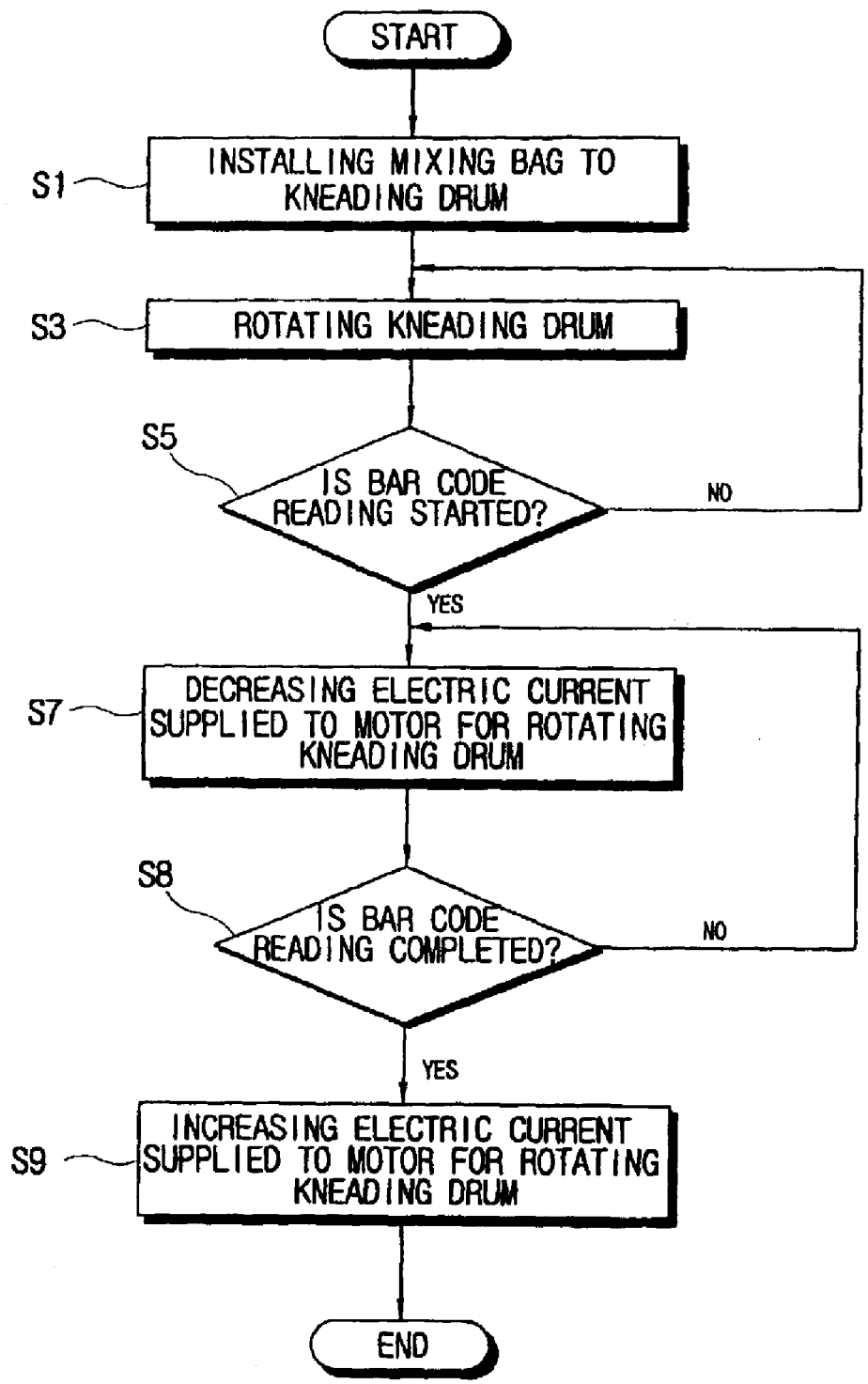
FIG. 8 is a control flowchart of the bread maker according to the embodiment of the present invention.

Thus, the bread maker according to the present invention is controlled as follows. Referring to FIG. 8, first, the mixing bag 7 is attached to the upper and lower kneading drums 11 and 13 (S1). Thereafter, the upper and lower kneading drums 11 and 13 are rotated (S3), and the bar code 9 on the mixing bag 7 is read by the bar code scanner 29, as the mixing bag 7 is wound on the kneading drums (S5). As the bar code scanner 29 starts reading the bar code 9, the controller 70 decreases the electric current supplied to the motor 26 to rotate the upper and lower kneading drums 11 and 13 at a predetermined bar code reading speed (S7). Then, the upper and lower kneading drums 11 are slowly rotated, thereby allowing the bar code scanner 29 to read the bar code 9 smoothly. When the bar code scanner 29 completely reads the bar code 9 (S8), the controller 70 increases the electric current supplied to the motor 26 to rotate the upper and lower kneading drums 11 and 13 at a predetermined dough kneading speed (S9).

Figure 9:
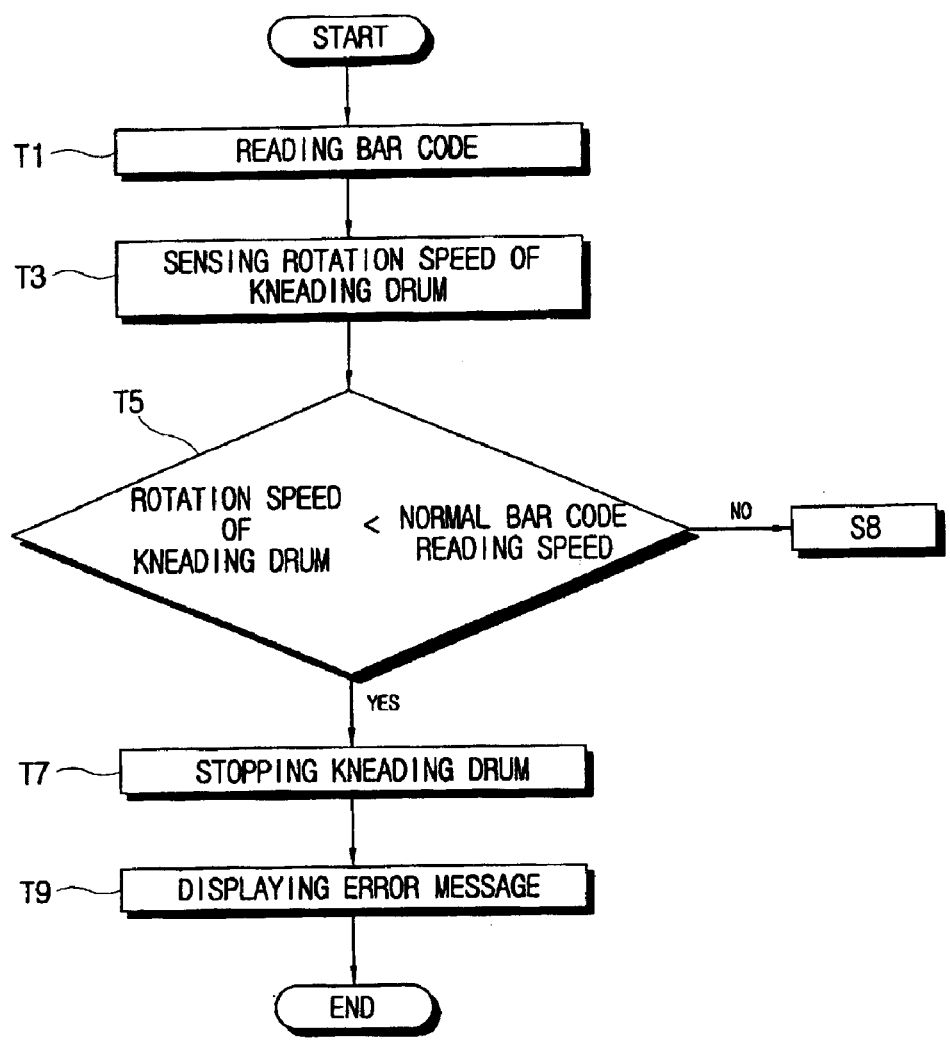
FIG. 9 is a control flowchart of a jam checking operation used when a bar code is read in the bread maker according to the embodiment of the present invention.

As the bar code scanner 29 reads the bar code 9, jams are determined as follows. Referring to FIG. 9, when the bar code scanner 29 starts reading the bar code 9 (T1), the controller 70 receives the pulse signals from the first and second disk sensors 63 and 65 (T3), and determines whether the rotation speed of the upper and lower kneading drums 11 and 13 is the predetermined bar code reading speed based upon the received pulse signals (T5). If the rotation speed is less than a predetermined bar code reading speed, the controller 70 stops the upper and lower kneading drums 11 and 13 from rotating (T7), and displays an error message on the display panel 5a (T9), thereby allowing a user to check whether the upper and lower kneading drums 11 and 13 are jammed by the mixing bag or an extraneous substance.

With this configuration, the kneading drums 11 and 13 are rotated more slowly when a bar code 9 is read than when dough is kneaded, so that the kneading drums 11 and 13 are prevented from becoming jammed. Further, when the bar code 9 is read, it is determined whether the kneading drums 11 and 13 are jammed based upon a pulse signal output from the rotation sensing part 61, so that the kneading drums 11 and 13 are automatically stopped in case of a jam.

As described above, the present invention provides a bread maker and a control method thereof, that can protect the bread maker from damage caused by kneading drums becoming jammed by a mixing bag or an extraneous substance while a bar code is read.

Although an embodiment of the present invention has been shown and described, it will be appreciated by those skilled in the art that changes may be made in these embodiments without departing from the principles and spirit of the invention, the scope of which is defined in the appended claims and their equivalents.

What is claimed is:

1. A bread maker, comprising:
   a main body forming an oven compartment;
   a pair of parallel kneading drums spaced apart from each other inside the oven compartment, to which are attached opposite ends of a mixing bag containing ingredients, the kneading drums reversing rotary direction periodically;
   a bar code scanner near one of the kneading drums to read a bar code printed on, or applied to, the mixing bag;
   a drum driving part rotating the kneading drums in clockwise and counterclockwise directions;
   a bar code reading checking part sensing whether the bar code scanner is reading the bar code; and
   a controller determining whether the bar code scanner is reading the bar code based upon a sensed signal output from the bar code reading checking part, and controlling the drum driving part to rotate the kneading drums at a predetermined bar code reading speed while the bar code scanner reads the bar code, and to rotate the kneading drums at a dough kneading speed that is faster than the bar code reading speed when the bar code scanner has completely read the bar code.

2. The bread maker according to claim 1, further comprising a rotation sensing part sensing a rotation speed of the one of the kneading drums,
   wherein the controller determines the rotation speed of the one of the kneading drums based upon a sensed signal of the rotation sensing part while the bar code is being read, and stops the drum driving part from operating when the rotation speed of the one of the kneading drums is less than the predetermined bar code reading speed.

3. The bread maker according to claim 2, wherein the rotation sensing part comprises:
   a disk part rotating with the one of the kneading drums, and having at least one projection radially extending from a circumference thereof; and
   a disk sensor emitting a light toward the disk part and outputting a pulse signal according to interruption of the light by rotation of the at least one projection of the disk part.

4. The bread maker according to claim 3, wherein the disk part comprises:
   a first disk having a single projection; and
   a second disk having a plurality of projections along a circumference thereof at regular intervals.

5. The bread maker according to claim 3, wherein the disk part is attached to a rotation shaft of the one of the kneading drums.

6. The bread maker according to claim 4, wherein the disk sensor comprises a light emitting part and a light receiving part facing each other with the disk part therebetween, the disk sensor outputting the pulse signal when the at least one projection of the disk part interrupts light emitted from the light emitting part to the light receiving part.

7. The bread maker according to claim 4, wherein the disk sensor senses one revolution of the one of the kneading drums using the first disk, and the disk sensor senses rotation of the one of the kneading drums that is less than one revolution using the second disk.

8. The bread maker according to claim 4, wherein the disk sensor outputs one pulse signal per revolution of the one of the kneading drums, and outputs a number of pulse signals per revolution of the one of the kneading drums equal to the number of projections on the second disk.

9. The bread maker according to claim 4, wherein the kneading drums comprise an upper kneading drum and a lower kneading drum.

10. The bread maker according to claim 9, wherein the drum driving part comprises a motor to rotate the lower kneading drum and a belt connecting the lower kneading drum to the upper kneading drum, the belt transmitting a rotary movement of the lower kneading drum to the upper kneading drum.

11. The bread maker according to claim 10, wherein the controller determines a rotation rate of the upper kneading drum using the output pulse signals and controls the motor to rotate the upper kneading drum and the lower kneading drum according to the determined rotation rate.

12. The bread maker according to claim 10, wherein when the pulse width of the pulse signals is greater than the predetermined pulse width, the controller determines a state of the bread maker to be abnormal and that the motor is overloaded, with the first disk and the second disk rotating slower than rotation thereof in a normal state.

13. A method of controlling a bread maker having a main body forming an oven compartment, a pair of parallel kneading drums spaced apart from each other inside the oven compartment, to which are attached opposite ends of a mixing bag containing ingredients, the kneading drums reversing rotary direction periodically, a bar code scanner near one of the kneading drums to read a bar code printed on, or applied to, the mixing bag, and a drum driving part rotating the kneading drums in clockwise and counterclockwise directions, the method comprising:
    rotating the kneading drums holding the mixing bag;
    determining whether the bar code scanner reads the bar code;
    rotating the one of the kneading drums at a predetermined bar code reading speed while the bar code scanner reads the bar code; and
    rotating the one of the kneading drums at a dough kneading speed that is faster than the bar code reading speed when the bar code scanner has completely read the bar code.

14. The method according to claim 13, further comprising stopping the drum driving part from operating when a rotation speed of the one of the kneading drums is less than the predetermined bar code reading speed by determining the rotation speed of the one of the kneading drums while the bar code is read.

15. The method according to claim 14, wherein the bread maker includes a disk part rotating with the one of the kneading drums and having at least one projection radially extending from a circumference thereof, and a disk sensor sensing the at least one projection of the disk part and outputting a pulse signal, the method further comprising:
    determining the rotation speed of the one of the kneading drums based upon the pulse signal output from the disk sensor.

* * * * *

UNITED STATES PATENT AND TRADEMARK OFFICE
CERTIFICATE OF CORRECTION

PATENT NO.       : 6,962,290 B2
APPLICATION NO. : 10/391772
DATED            : November 8, 2005
INVENTOR(S)      : Yong-hyun Kwon et al.

It is certified that error appears in the above-identified patent and that said Letters Patent is hereby corrected as shown below:

On the cover page, (56) References cited, U.S. Patent Document, column 1, line 2, change "Coll et al." to --Coil et al.--

Signed and Sealed this

Third Day of October, 2006

JON W. DUDAS
*Director of the United States Patent and Trademark Office*